No. 610,308. Patented Sept. 6, 1898.
D. C., W. R. & M. R. SEAMAN.
EXPANSION ANCHOR.
(Application filed Feb. 19, 1898.)
(No Model.)
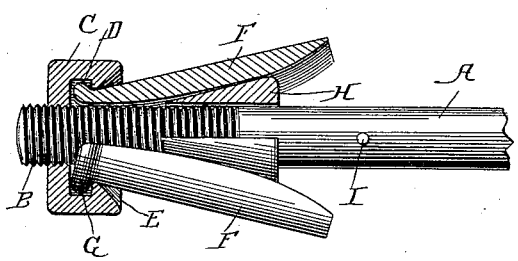
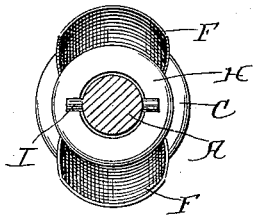
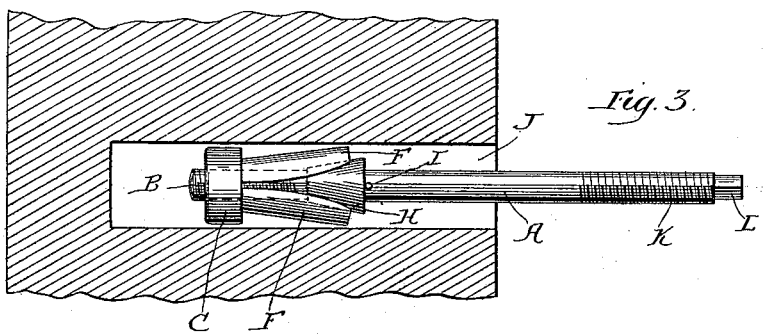
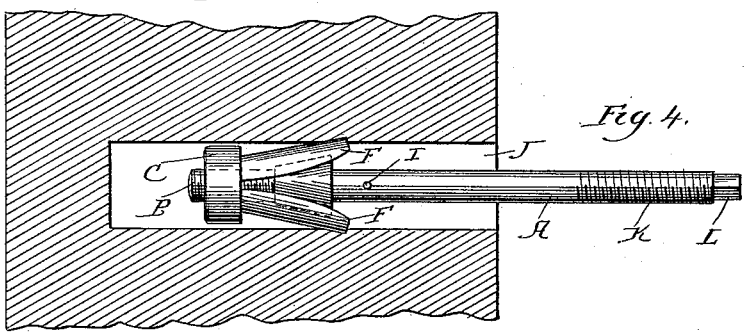
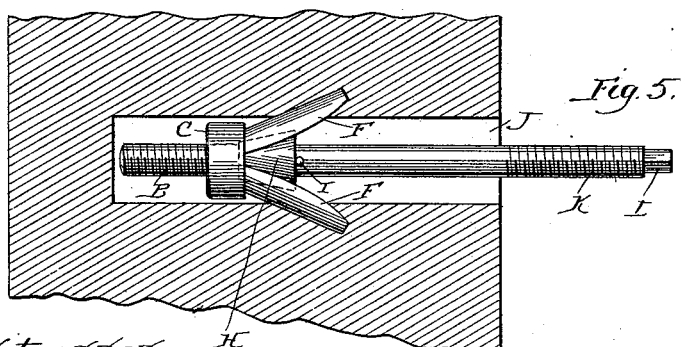
Witnesses:
H. B. Hallock.
R. M. Pierce.
Inventors:
Daniel C. Seaman
Wilson R. Seaman
Milton R. Seaman
by J. J. Williamson
Attorney.

United States Patent Office.

DANIEL C. SEAMAN, WILSON R. SEAMAN, AND MILTON R. SEAMAN, OF PHILADELPHIA, PENNSYLVANIA.

EXPANSION-ANCHOR.

SPECIFICATION forming part of Letters Patent No. 610,308, dated September 6, 1898.

Application filed February 19, 1898. Serial No. 670,883. (No model.)

*To all whom it may concern:*

Be it known that we, DANIEL C. SEAMAN, WILSON R. SEAMAN, and MILTON R. SEAMAN, citizens of the United States, residing at Philadelphia, in the county of Philadelphia and State of Pennsylvania, have invented a certain new and useful Improvement in Expansion-Anchors, of which the following is a specification.

Our invention relates to a new and useful improvement in expansion-anchors for bolts and the like, and has for its object to provide an exceedingly simple, cheap, and effective device of this description which may be secured within a wall by simply drilling a hole therein and passing the anchor into place and then properly manipulating the same; and a further object of our invention is to so construct such an anchor as to provide for its ready removal when occasion requires.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 is a view, partly in section, showing the construction of our improvement; Fig. 2, an end view of the anchor, the bolt-rod being in section; Fig. 3, a section of a portion of a wall having a hole drilled therein and our improved anchor inserted within the hole, but the blades thereof not having been expanded; Fig. 4, a similar view showing the initial expansion of the anchor-blades; and Fig. 5, a similar view showing the device when the anchors have been fully expanded, thus firmly anchoring the rod within the wall.

In carrying out our improvement as here embodied we provide a rod A, which is threaded upon its inner end, as indicated at B, so as to receive the nut C. This nut is preferably round and has an annular groove D formed in the interior thereof, from which a chamfered section E extends outward.

The anchor-blades F have beads G formed thereon, which are adapted to fit within the annular groove D, as clearly shown in Fig. 1, and thus confine the inner ends of these blades by permitting a limited swinging movement, and in practice the beads of the blades are first placed within the annular groove and then the nut run upon the threads B of the rod, which latter will prevent the withdrawal of the blades from the groove. The inner surfaces of the anchor-blades are flared outward, and a wedge-plug H is fitted upon the rod, so as to freely slide thereon, while the pin I, set in said rod and projecting upon each side thereof, serves to limit the sliding movement of the plug, for the purpose hereinafter set forth.

Now when our improved anchor is to be secured within a wall or the like, a hole J is drilled or otherwise formed within said wall to the desired depth and of a diameter adapted to receive the anchor, and said anchor is passed within this hole, as clearly indicated in Fig. 3, after which the wedge-plug H is slid inward by the use of any suitable implement to a sufficient degree to force the anchor-blades outward to the position indicated in Fig. 4. This, of course, will cause the outer ends of said blades to take a hold upon the walls of the hole, so that the rod may be turned upon its axis without revolving the blades or the nut, the result of which will be that the rod will travel by reason of the threads B engaging with the threads of the nut, and when this movement has been sufficient to bring the pin I into engagement with the wedge-plug H a further revolving of the rod will force said plug between the blades and cause the latter to assume the position shown in Fig. 5, which will firmly secure the anchor within the wall.

Of course our improvement may be used for various purposes, but it is especially adapted for securing brackets and the like to a wall, and for this purpose suitable screw-threads K are formed upon the outer end of the rod to receive the nut in the securement of such a bracket, and we have also shown a wrenchhold L upon the outer end of the bolt, so as to facilitate its manipulation. When it is desired to remove the rod, it is to be revolved upon its axis in a reverse direction, thereby backing the threads B from out the nut and likewise drawing the pin I out of contact with the wedge-plug, which will permit said wedge to slide backward and the blades to move inward.
Heretofore much difficulty has been experienced in the securement of rods in walls where it was not desirable or possible to pass the rod through the wall and secure it upon the opposite side, and much expense and annoyance were therefore occasioned, whereas by our improvement these disadvantages are entirely overcome and a simple and efficient device provided which may be quickly anchored, and when so secured will be firmly held in place and may be then utilized for the attachment of various objects to the surface of a wall.

Having thus fully described our invention, what we claim as new and useful is—

1. An expansion-anchor consisting of a rod having threads thereon, a nut run upon said threads, said nut having an internal groove, anchor-blades having their inner ends secured within said groove, a wedge-plug fitted to slide upon the rod and adapted to force the blades open, and a pin projecting from the rod for causing the wedge-plug to travel relative to the blades, as specified.

2. The herein-described combination of a rod having threads formed thereon, a nut adapted to run upon said threads, said nut having an annular groove formed in the interior thereof, a chamfered section leading from said groove, two anchor-blades each having a bead upon one end adapted to fit within a groove, a wedge-plug arranged to slide upon the rod so as to expand the blades, and a pin set within the rod and projecting therefrom by means of which the wedge-plug may be moved longitudinally relative to the blades, as specified.

In testimony whereof we have hereunto affixed our signatures in the presence of two subscribing witnesses.

DANIEL C. SEAMAN.
   WILSON R. SEAMAN.
   MILTON R. SEAMAN.

Witnesses:
 LINA WIETMANN,
 J. BAKER STEWARD.